United States Patent [19]

Sahara et al.

[11] 4,183,064
[45] Jan. 8, 1980

[54] VIDEO SIGNAL REPRODUCING APPARATUS WITH ELECTRON BEAM SCANNING VELOCITY MODULATION

[75] Inventors: Hiroshi Sahara; Yutaka Tanaka, both of Yokohama, Japan

[73] Assignee: Sony Corporation, Tokyo, Japan

[21] Appl. No.: 852,790

[22] Filed: Nov. 18, 1977

[30] Foreign Application Priority Data

Nov. 29, 1976 [JP] Japan .................. 51-143118

[51] Int. Cl.$^2$ .............................................. H04N 5/63
[52] U.S. Cl. .................................... 358/242; 358/166
[58] Field of Search ............................... 358/242, 166

[56] References Cited

U.S. PATENT DOCUMENTS 3,935,384  1/1976  Jirka ...................................... 358/242

Primary Examiner—Richard Murray
Attorney, Agent, or Firm—Lewis H. Eslinger; Alvin Sinderbrand

[57] ABSTRACT

In a video signal reproducing apparatus having a cathode ray tube in which at least one electron beam is made to scan a screen in line-scanning and vertical directions while the intensity of the beam is modulated to establish the brightness of a video picture to be displayed on the screen, and in which bright picture portions are represented by respective high level portions of a video signal; a waveshaping circuit receives the video signal and acts thereon to provide a compensated video signal in which the width of each high level portion between the respective rising and falling edges is increased, the compensated video signal is employed to control the intensity of the electron beam, and the rising and falling edges of each high level portion of the compensated video signal are detected, as by a differentiating circuit or a delay line circuit, to provide respective output signals by which the scanning velocity of the beam in the line-scanning direction is modulated. The waveshaping circuit for providing the compensated video signal may be constituted by a delay line and an OR circuit having inputs to which the original video signal and the delayed video signal are applied, or by a differentiator receiving the original video signal and having its output applied to a polarity equalizer.

9 Claims, 26 Drawing Figures

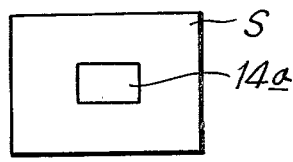
FIG. IA
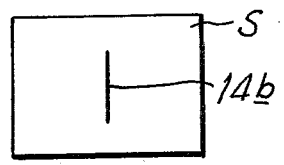
FIG. IB
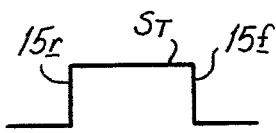
FIG. 2A
PRIOR ART
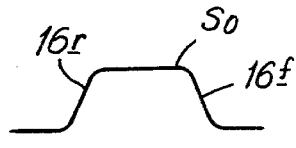
FIG. 2B
PRIOR ART
FIG. 2C
PRIOR ART
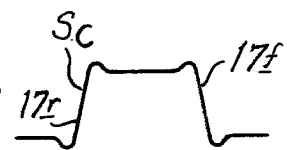
FIG. 2D
PRIOR ART
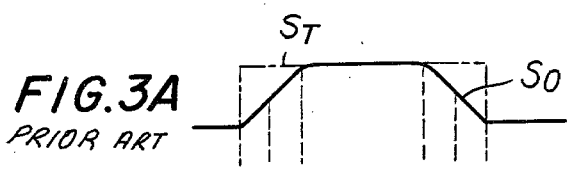
FIG. 3A
PRIOR ART
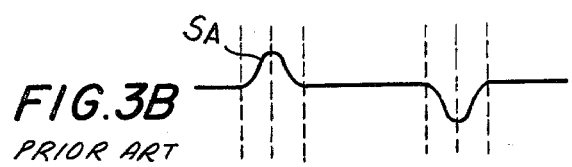
FIG. 3B
PRIOR ART
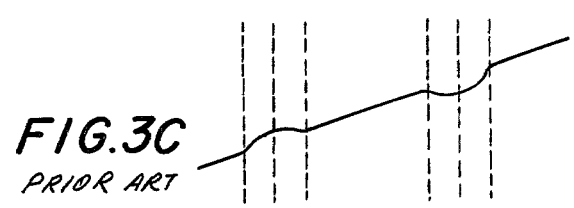
FIG. 3C
PRIOR ART
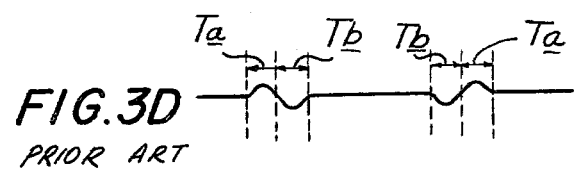
FIG. 3D
PRIOR ART
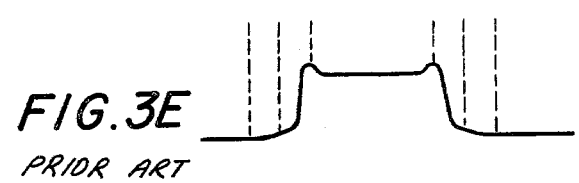
FIG. 3E
PRIOR ART

VIDEO SIGNAL REPRODUCING APPARATUS WITH ELECTRON BEAM SCANNING VELOCITY MODULATION

BACKGROUND OF THE INVENTION

1. Field of the Invention

This invention relates generally to video signal reproducing apparatus, such as, television receivers, and more particularly is directed to providing such apparatus with improved arrangements for effecting electron beam scanning velocity modulation so as to significantly enhance the sharpness of the reproduced picture or image.

2. Description of the Prior Art

When the phosphor screen of a video signal reproducing apparatus, such as, the screen of the cathode ray tube in a television receiver, is scanned by an electron beam or beams so as to form a picture or image on the screen, the beam current varies with the luminance or brightness level of the input video signal. Therefore, each electron beam forms on the phosphor screen a beam spot whose size is larger at high brightness levels than at low brightness levels of the image so that sharpness of the reproduced picture is deteriorated, particularly at the demarcation between bright and dark portions on areas of the picture. Further, when a beam scanning the screen in the line-scanning direction moves across the demarcation or edge between dark and bright areas of the picture, for example, black and white areas, respectively, the frequency response of the receiver does not permit the beam intensity to change instantly from the low level characteristic of the black area to the high level characteristic of the white area. Therefore, the sharpness of the reproduced image is degraded at portions of the image where sudden changes in brightness occur in response to transient changes in the luminance or brightness of the video signal being reproduced. The increase in the beam current and in the beam spot size for bright portions of the reproduced picture or image and the inadequate frequency response of the television receiver to sudden changes in the brightness or luminance level of the incoming video signal are additive in respect to the degradation of the horizontal sharpness of the reproduced image or picture.

It has been proposed to compensate for the described degradation of the horizontal sharpness of the picture or image by employing the so-called "aperture correction or compensation technique," for example, as described in "Aperture Compensation for Television Camera," R. C. Dennison, RCA Review, 14,569 (1953). In accordance with such aperture correction or compensation technique, the intensity of the electron beam is first decreased and then increased at those portions of the picture image at which the brightness changes from a low level to a high level. Such modification or compensation of the electron beam intensity can be achieved by twice differentiating the original video signal so as to obtain a compensation signal which is added to the original video signal for obtaining a compensated video signal applied to the cathode of the cathode ray tube and having high level portions with relatively more steeply inclined rising and falling edges. However, with the foregoing aperture compensation technique, the peak luminance or brightness levels of the compensated video signal are increased and, as applied to the cathode of the cathode ray tube, result in beam currents that are increased relative to the maximum beam currents resulting from the original video signal so that the beam spot size is actually increased. By reason of the foregoing, the aperture compensation technique or method is insufficient for achieving really sharp definitions between light and dark areas of the reproduced picture or image, particularly in the case of relatively large screen areas, even though the described technique creates a visual edge effect which, to some extent, and particularly in the case of relatively small screens, registers psychologically as improved edge sharpness.

In order to avoid the above-described disadvantage of the aperture correction or compensation technique, it has been proposed to employ the so-called "beam velocity modulation method or technique" in which transient changes in the brightness level of the video signal are detected, and the scanning velocity of the electron beam in the line-scanning direction is modulated in accordance with the thus detected transient changes, for example, as described in detail in U.S. Pat. Nos. 2,227,630, 2,678,964, 3,752,916, 3,830,958 and 3,936,872, with the last two enumerated patents having a common assignee herewith.

More particularly, in the known beam velocity modulation technique or method, the original video signal representing brightness or luminance of a video picture and which incorporates "dullness" at abrupt changes in the luminance level due to the inadequate frequency response of the television receiver circuits to such abrupt changes in luminance level, is applied directly to the cathode or beam producing means of the cathode ray tube for modulating the intensity of the electron beam or beams, and such original video signal is also differentiated to obtain a modulation signal which is employed for effecting a supplemental horizontal deflection of the beam or beams in addition to the main or usual horizontal deflection thereof. The modulation or compensation signal may be supplied to the main deflection coil or yoke or to a supplemental deflection coil which is in addition to the main deflection coil with the result that the overall magnetic field acting on the beam or beams for effecting horizontal deflection thereof is modulated and corresponding modulation of the beam scanning velocity in the line-scanning direction is achieved. As is well known, the effect of the foregoing is to improve the sharpness of the image or picture in the horizontal direction. Since the original video signal is applied directly to the cathode or beam producing means of the cathode ray tube without increasing the level thereof at sharp changes in the brigheness level of the video signal, as in the aperture correction or compensation technique, the beam velocity modulation technique does not cause changes in the beam spot size so that sharpness of the image or picture in the horizontal direction is conspicuously improved.

However, it is a characteristic or inherent disadvantage of existing beam velocity modulation arrangements that the improved horizontal sharpness of the reproduced image or picture is achieved at the expense of a reduction in the width of the bright or white areas of the reproduced image or picture so that such bright or white areas are slimmer or more slender than would be the case if the depicted scene were accurately or precisely reproduced.

OBJECTS AND SUMMARY OF THE INVENTION

Accordingly, it is an object of this invention to provide a video signal reproducing apparatus with an improved arrangement for effecting beam scanning velocity modulation and thereby achieving enhanced sharpness of the reproduced image or picture, particularly at the demarcations between relatively dark and light picture areas, without reducing the widths of such light picture areas.

Another object is to provide an arrangement for effecting beam scanning velocity modulation, as aforesaid, which is relatively simple and is readily applicable to video signal reproducing apparatus, such as, television receivers.

In accordance with an aspect of this invention, in a video signal reproducing apparatus having a cathode ray tube in which at least one electron beam is made to scan a screen in line-scanning and vertical directions while the intensity of the beam is modulated to establish the brightness of a video picture to be displayed on the screen, and in which bright picture portions are represented by respective high level portions of an original video signal; a waveshaping circuit receives the original video signal and acts thereon to provide a compensated video signal in which the width of each high level portion between the respective rising and falling edges is increased, the compensated video signal is employed to control the intensity of the electron beam, and the rising and falling edges of each high level portion of the compensated video signal are detected to provide a respective output or modulation signal by which the scanning velocity of the beam in the line-scanning direction is modulated.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIGS. 1A and 1B are diagrammatic views representing reproduced video pictures including bright and dark areas;

FIGS. 2A-2D are waveform or graphic views to which reference will be made in explaining the aperture correction or compensation technique of the prior art;

FIGS. 3A-3E are waveform or graphic views to which reference will be made in explaining the beam velocity modulation technique of the prior art and the disadvantage inherent therein;

DESCRIPTION OF THE PREFERRED EMBODIMENTS

Figure 4:
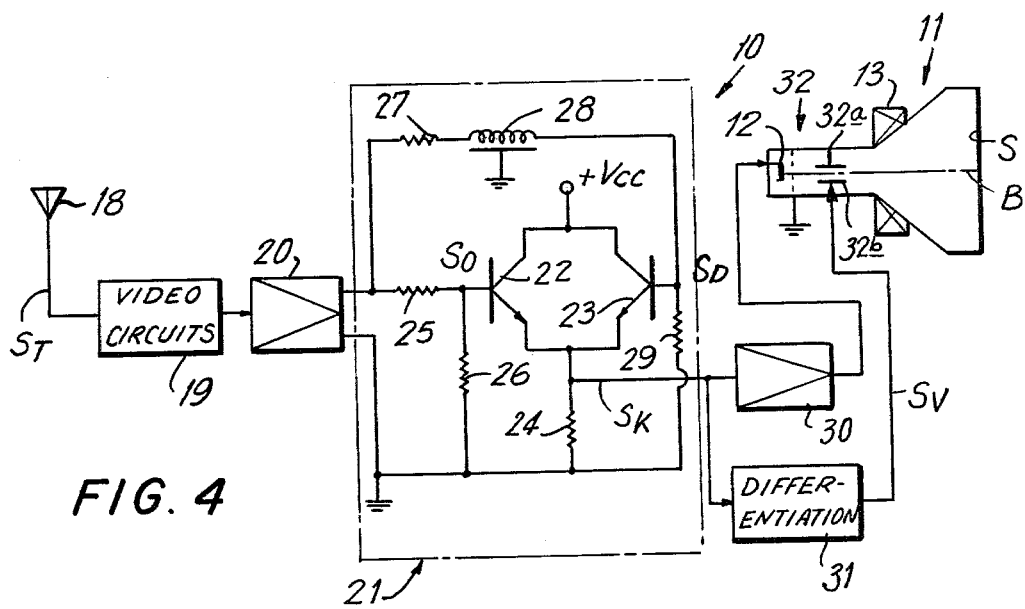
FIG. 4 is a schematic view illustrating a circuit according to an embodiment of the present invention for effecting beam velocity modulation in a video signal reproducing apparatus.

Referring to the drawings in detail, and initially to FIG. 4 thereof, it will be seen that the present invention is related to a television receiver or other video signal reproducing apparatus 10 having a cathode ray tube 11 in which a beam producing means including a cathode 12 directs an electron beam B generally along the axis of the tube envelope toward a phosphor screen S on the faceplate of the tube. In the apparatus 10, the intensity of electron beam B, and hence the brightness of the beam spot produced at the location where the beam B impinges on screen S, is modulated in accordance with a video signal applied to cathode 12 and representing at least the brightness of a video picture to be reproduced on screen S. The cathode ray tube 11 is further shown to include the conventional deflection means or yoke 13 by which beam B is made to scan screen S in the line-scanning or horizontal and vertical directions, respectively. The simultaneous modulation of the beam intensity by the video signal applied to cathode 12 and the scanning of screen S by beam B in response to sweep signals applied to yoke 13 will result in the reproduction of an image or picture on screen S. The image or picture reproduced on screen S may be constituted by at least one white or bright picture portion, for example, in the form of a rectangle as shown at 14a on FIG. 1A, or in the form of a vertical line as indicated at 14b on FIG. 1B, and relatively darker picture portions. In any case, it will be understood that, in each line or horizontal interval of a video signal received by a television receiver and utilized in the cathode ray tube of the latter for reproducing a horizontal increment of an image or picture at a vertical position in the latter which is included in the bright or white area 14a or line 14b, the respective bright picture portion is represented by a corresponding high level video signal portion defined between rising and falling edges 15r and 15f, respectively (FIG. 2A). If the transmitted video signal $S_T$ is to represent a white or bright shape or area surrounded by a black or very dark background with a sharp demarcation therebetween, the rising and falling edges 15r and 15f of the high level signal portion will be precipitous, that is, substantially vertical, as shown, so as to represent the desired high frequency change in luminance level. However, the usual television receiver circuit, for example, comprised of RF and IF amplifiers and a video detector, and by which the video signal to be used in the cathode ray tube is derived from the received television signal, has a frequency response that is inadequate to accommodate the mentioned high frequency components of the transmitted video signal $S_T$. Thus, the video signal $S_O$ (FIG. 2B) which is available in the television receiver for controlling the intensity of the electron beam or beams in the cathode ray tube is relatively "dull" that is, it has decreased high frequency components, as represented by the illustrated sloping, rising and falling edges 16r and 16f of the high level signal portion. Such relatively dull video signal $S_O$ is hereinafter referred to as the "original video signal," and such terminology is reasonable when considered from the point of view of the input side of the cathode ray tube. Further, the term "original video signal" has often been used in the prior art in the same sense that it is used herein.

The decrease in the high frequency components of the original video signal $S_o$ as compared with the transmitted video signal $S_T$ causes a decrease in the horizontal sharpness of the reproduced image or picture, that is, the sloping, rising and falling edges 16r and 16f (FIG. 2B) result in a gradual change from dark to bright and from bright to dark, respectively, rather than in the sudden changes in brightness represented by the transmitted signal $S_T$ (FIG. 2A). Horizontal sharpness of the reproduced image or picture is furthermore decreased by the fact that, in the cathode ray tube, the electron beam current varies with the luminance or brightness level of the video signal applied to the cathode ray tube and, when the luminance level is high, for example, to represent a bright or white area of the picture, the beam spot size caused by impingement of the electron beam on the phosphor screen is enlarged to further decrease or deteriorate the sharpness of the reproduced picture.

In seeking to compensate for the above-described lack of sharpness of the reproduced picture by the known aperture correction or compensation technique, the original video signal $S_O$ (FIG. 2B) is differentiated twice so as to obtain a compensation signal $S_B$ (FIG. 2C) which is added to the original video signal $S_O$ for providing a compensated video signal $S_C$ (FIG. 2D). As shown, the compensated video signal $S_C$ has rising and falling edges 17r and 17f which are more steeply inclined than the corresponding rising and falling edges 16r and 16f of the original video signal $S_O$. However, when the compensated video signal $S_C$ is applied to the cathode of a cathode ray tube for controlling the intensity or beam current of the electron beam or beams therein, the sharpness of the reproduced picture is not conspicuously improved. The foregoing results from the fact that, by adding the compensation signal $S_B$ to the original video signal $S_O$ for obtaining the compensated video signal $S_C$ applied to the cathode of the cathode ray tube, the maximum beam current corresponding to the peak luminance level of signal $S_C$ is increased, as compared with the maximum beam current corresponding to the peak luminance level of original video signal $S_O$, with the result that the beam spot size resulting from compensated video signal $S_C$ is enlarged. Such enlargement of the beam spot size causes a decrease in sharpness of the reproduced picture, as previously noted, and thus substantially defeats any increase in sharpness that might result from the relatively more steeply inclined rising and falling edges 17r and 17f of the compensated video signal $S_C$.

In the known beam velocity modulation technique for improving horizontal sharpness of the reproduced image or picture, the dull original video signal $S_O$ (FIG. 3A) is applied, without alteration, to the cathode or beam producing means of the cathode ray tube for determining the intensity or beam current of the electron beam or beams in the cathode ray tube. The original video signal $S_O$ is also subjected to differentiation to obtain a compensation signal $S_A$ (FIG. 3B). The compensation signal $S_A$ is applied to a supplemental deflection means which is in addition to the main deflection coils or yoke so that the horizontal deflection field for effecting scanning movement of each beam in the line-scanning direction is modified or compensated, as shown on FIG. 3C. As a result of such modified or compensated horizontal deflection field, the beam scanning velocity in the line-scanning direction, is modulated as shown on FIG. 3D. It will be appreciated that, during each period $T_a$ on FIG. 3D, the beam scanning velocity is increased so that a decreased amount of light is emitted from the phosphor dots or areas on the screen that are impinged upon during each period $T_a$. On the other hand, during each period $T_b$, the beam velocity is decreased so that an increased amount of light is emitted from the phosphor dots or areas impinged upon by the electron beam during each period $T_b$. Therefore, the variation, in the horizontal direction across the screen, in the amount of emitted light, is substantially as indicated on FIG. 3E, from which it will be apparent that the sharpness of the reproduced image or picture in the horizontal direction is improved. Since the original video signal $S_O$ is still applied to the cathode of the cathode ray tube for controlling the beam intensity, the beam spot size is not changed or increased by reason of the beam velocity modulation and, therefore, the improvement in sharpness in the horizontal direction is not adversely affected by increasing beam spot size, as in the aperture correction or compensation technique. However, the conventional beam velocity modulation technique still has the disadvantage that the width of each white or bright portion of the picture or image reproduced on the screen is less than that which would result from the original video signal $S_o$ in the absence of the beam velocity modulation, as is apparent from the comparison of FIG. 3E with FIG. 3A.

Generally, in order to avoid the foregoing disadvantage of the previously known beam velocity modulation technique, the present invention employs a waveshaping circuit receiving the original video signal and providing a corresponding compensated video signal in which the width of each high level signal portion is increased relative to the corresponding width of the original video signal. The compensated video signal from the mentioned waveshaping circuit is applied to the cathode or beam producing means of the cathode ray tube for modulating the intensity of the electron beam or beams therein in accordance with the compensated video signal, while the rising and falling edges of the high level signal portions of the compensated video signal are detected to provide a corresponding output or modulating signal applied to the beam velocity modulation means for modulating the scanning velocity of the electron beam or beams in accordance with such output signal.

Referring in detail to FIG. 4, it will be seen that, in the video signal reproducing apparatus 10 according to this invention, as there shown, an antenna 18 receives a television signal which includes the transmitted video signal $S_T$ (FIG. 2A) and applies the same to conventional video circuits indicated schematically at 19 and which include the usual RF and IF amplifiers and video detector for deriving the original video signal $S_O$ (FIG. 6A) from the received television signal. As noted, the video circuits 19 of television receiver 10 are conventional so that no detailed explanation thereof will be included herein. The video signal from circuit 19 is supplied through a video amplifier 20 to a waveshaping circuit 21 which, in accordance with this invention, is operative to increase the width of each high level portion of the original video signal $S_O$ from video amplifier 20.

The waveshaping circuit 21 is shown to include a pair of transistors 22 and 23 having their collectors connected together to an operating voltage source $+V_{cc}$, while the emitters of transistors 22 and 23 are connected together to one end of a resistor 24 having its other end connected to ground. The original video signal $S_O$ (FIG. 6A) is applied to the base of transistor 22 from video amplifier 20 through a resistor 25, and the base of transistor 22 is further connected to ground through a resistor 26. The original video signal $S_O$ from video amplifier 20 is further applied through a resistor 27 and a delay line 28 to the base of transistor 23 which is further connected to ground through a resistor 29. The resistors 27 and 29 provide impedance matching for the delay line 28, while the resistors 25 and 26 are provided for level adjusting purposes, that is, to ensure that the level of the original video signal $S_O$ applied to the base of transistor 22 from video amplifier 20 will be equal to the level of the delayed video signal $S_D$ (FIG. 6B) applied to the base of transistor 23 and which is delayed by the time $\tau$ in respect to the original video signal. Finally, the output of waveshaping circuit 21 is derived from a connection point between the emitters of transistors 22 and 23 and resistor 24.

It will be apparent that, during the period $T_A$ (FIG. 6C), the level of original video signal $S_O$ applied to the base of transistor 22 is higher than the level of the delayed video signal $S_D$ applied to the base of transistor 23, so that transistor 22 is turned ON and transistor 23 is turned OFF. During the next period $T_B$, at which time both original video signal $S_O$ and delayed video signal $S_D$ are at the same level, transistors 22 and 23 are both turned ON. Finally, during the concluding period $T_C$, the level of delayed video signal $S_D$ is higher than the level of original video signal $S_O$, so that transistor 22 is turned OFF and transistor 23 is turned ON. Thus, as is apparent on FIG. 6C, the level of the compensated video signal $S_K$ obtained across resistor 24, that is, at the output of waveshaping circuit 21, is equal to the level of the input video signal $S_O$ during the period $T_A$, is equal to the level of either the original video signal $S_O$ or the delayed video signal $S_D$ during the period $T_B$, and is equal to the level of the delayed video signal $S_D$ during the period $T_C$. In other words, transistors 22 and 23 of waveshaping circuit 21 operate as an OR gate circuit in respect to the original video signal $S_O$ and the delayed video signal $S_D$ applied to the two inputs of such OR circuit defined by the base electrodes of the two transistors. Further, by comparing the compensated video signal $S_K$ (FIG. 6C) with the original video signal $S_O$ (FIG. 6A), it will be appreciated that the effect of waveshaping circuit 21 is to increase the width of each high level portion of the original or incomming video signal.

Referring again to FIG. 4, it will be seen that the compensated video signal $S_K$ is applied through a video amplifier 30 to the cathode electrode 12 of cathode ray tube 11 for modulating the intensity of electron beam B therein. Simultaneously, the rising and falling edges of the high level signal portions of compensated video signal $S_K$ are detected to provide a corresponding output or modulating signal by which the scanning velocity of the electron beam B in the line-scanning direction is modulated. More particularly, in the television receiver 10 of FIG. 4, the compensated video signal $S_K$ from waveshaping circuit 21 is applied to a differentiation circuit 31 which acts as a detector for detecting the rising and falling edges of the compensated video signal and which provides a corresponding output signal in the form of a differentiated signal $S_V$ (FIG. 6D). Such differentiated signal $S_V$ is applied to a beam velocity modulation means, for example, in the form of the supplemental deflection device 32 of FIG. 4, for modulating the scanning velocity of the electron beam B in the line-scanning direction in accordance with the differentiated signal $S_V$ from differentiator 31. The supplemental deflection device 32 may be constituted, as shown, by two spaced apart plate-like electrodes 32a and 32b directed vertically in cathode ray tube 11 and arranged for the passage of electron beam B therebetween, with the differentiated signal $S_V$ being applied across the plate-like electrodes 32a and 32b so as to produce a corresponding electrical field by which the scanning velocity of the beam, in the line-scanning direction, is modulated, for example, as shown on FIG. 6E.

Although the beam velocity modulation means is, in the embodiment of FIG. 4, constituted by a supplemental deflection device 32 in the form of a pair of plate-like electrodes 32a, 32b across which the output of differentiation circuit 31 is applied, the present invention is preferably employed in connection with a cathode ray tube of the type disclosed in detail by U.S. Pat. No. 3,936,872, and having an electron gun provided with a special focusing electrode to also function as the beam velocity modulating means, as shown on FIG. 5. More particularly, in the cathode ray tube 11A of FIG. 5, the neck portion 33 of the tube envelope is shown to contain an electron gun structure including a cathode 12a, a control electrode or grid 35, an acceleration electrode or grid 36, a first anode electrode 37, a focusing electrode 38 and a second electrode 39 all arranged successively in axial alignment along the central axis 40 of the cathode ray tube. The focusing electrode 38 is shown to be tubular and to be formed in two parts 38a and 38b which are axially separated along a vertical plane that is inclined relative to the axis 40 of the tube. For the operation of electron gun 34, appropriate static or bias voltages are applied to grids 35 and 36 and to electrodes 37, 38 and 39. Thus, for example, a voltage of zero to $-400$ V. may be applied to grid 35, a voltage of zero to 500 V may be applied to grid 36, a relatively high voltage or potential, for example, an anode voltage of 13 to 20 KV. may be applied to electrodes 37 and 39, and a relatively low voltage or potential of zero to only several KV. may be applied to parts 38a and 38b of electrode 38, with all of the foregoing voltages being upon the bias voltage applied to cathode 12a as a reference. With the foregoing voltage distribution, an electron lens field is established around the axis of electrode 38 by the electrodes 37, 38 and 39 to form a main focusing lens by which the electron beam is focused at the screen of the cathode ray tube. Furthermore, the differentiated or modulation signal $S_V$ from differentiation circuit 31 of FIG. 4 is applied between parts 38a and 38b of electrode 38 in superposed relation to the static or bias voltage applied to electrode 38 for forming the focusing lens. It will be apparent that, by reason of the described diagonal separation between parts 38a and 38b of focusing lens electrode 38, the application of the differentiated signal or modulation signal $S_V$ across electrode parts 38a and 38b results in a respective electric field which is operative to deflect the electron beam or beams in the horizontal or line-scanning direction. Thus, the beam velocity in the line-scanning direction is modulated accordingly.

Figure 6A:
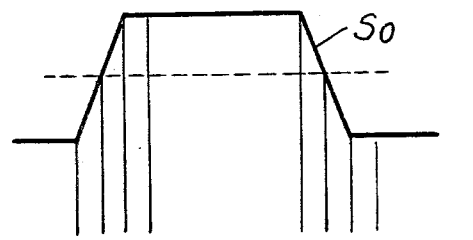
FIGS. 6A-6F are waveforms or graphic views to which reference will be made in explaining the operation of the circuit according to this invention as shown on FIG. 4.
Figure 6B:
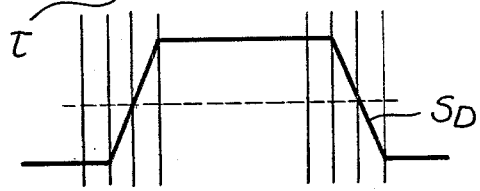
Figure 6C:
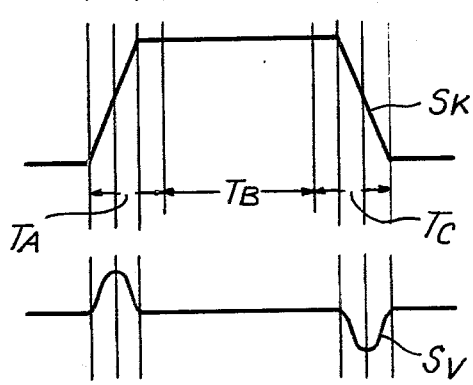
Figure 6D:
Figure 6E:
Figure 6F:
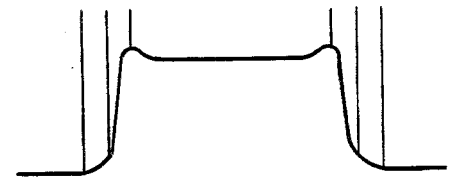

Whether the velocity modulation signal $S_V$ is applied to the plates 32a and 32b of supplemental deflection device 32, or across the parts 38a and 38b of focusing electrode 38, it will be seen that, in accordance with this invention, such velocity modulation signal $S_V$ (FIG. 6D) for effecting beam velocity modulation in the line-scanning direction is derived from the compensated video signal $S_K$ (FIG. 6C) in which the width of each bright or white signal portion is enlarged as compared with the width thereof in the original video signal $S_O$ (FIG. 6A). Therefore, the intensity of light emission is changed or varied in the horizontal direction across the screen in the manner represented by FIG. 6F, from which it is apparent that the sharpness of the reproduced image or picture in the horizontal direction is substantially improved. Furthermore, from a comparison of FIG. 6F with FIG. 6A, it will be apparent that, by a proper selection of the delay time $\tau$ of delay line 28, the width of the white or bright portion of the reproduced image or picture is not substantially decreased and may be made to accurately correspond to the width of corresponding high level portion of the original video signal. Therefore, the previously described disadvantage of the known technique for effecting beam velocity modulation has been avoided by the present invention.

Figure 7:
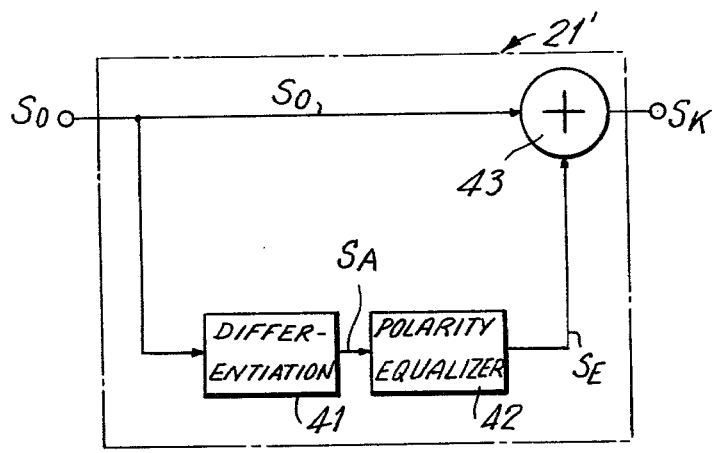
FIG. 7 is a schematic view illustrating another embodiment of a portion of the circuit shown on FIG. 4 for effecting beam velocity modulation according to this invention.
Figure 8A:
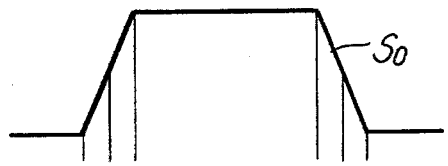
FIGS. 8A-8D are waveforms or graphic views to which reference will be made in explaining the operation of the embodiment of this invention illustrated by FIG. 7.
Figure 8B:
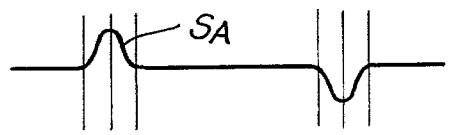
Figure 8C:
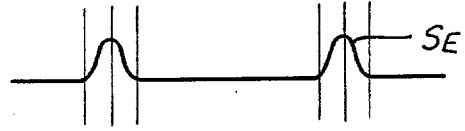
Figure 8D:
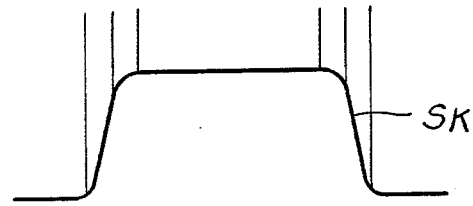

Referring now to FIG. 7, it will be seen that, in accordance with another embodiment of this invention, a waveshaping circuit 21' which can be substituted for the waveshaping circuit 21 of the apparatus 10 of FIG. 4, includes a differentiation circuit 41, a polarity equalizer 42 and an adding circuit 43. The original video signal $S_O$ (FIG. 8A) from video amplifier 20 on FIG. 4 is applied directly to one input of adding circuit 43 and also to differentiation circuit 41 which provides a corresponding differentiated signal $S_A$ (FIG. 8B). The differentiated signal $S_A$ from circuit 41 is applied to polarity equalizer 42 in which the negative polarity portion of the differentiated signal $S_A$, which corresponds to the falling edge of the original video signal $S_O$, is inverted so as to have a positive polarity. The resulting polarity equalized signal $S_E$ (FIG. 8C) is applied to another input of adder circuit 43 so as to be added in the latter to the original video signal $S_O$ and thereby obtain the compensated video signal $S_K$ (FIG. 8D). Such compensated video signal $S_K$ shown on FIG. 8D corresponds generally to the compensated video signal $S_K$ previously described with reference to FIG. 6C, and is similarly applicable to amplifier 30 and differentiation circuit 31 of FIG. 4. It will be apparent that the compensated video signal $S_K$ (FIG. 8D) obtained from waveshaping circuit 21' also has the width of its high level signal portions enlarged relative to the widths of such signal portions in the original video signal $S_O$. Therefore, when the compensated video signal $S_K$ from waveshaping circuit 21' is applied through amplifier 30 to cathode 12 of cathode ray tube 11 and also to differentiation circuit 31 to form therefrom the beam velocity modulation signal $S_V$ applied to the supplemental deflection device 32, the resulting beam velocity modulation is performed in the same manner as described above with reference to FIG. 4 so as to obtain improved horizontal sharpness of the resulting reproduced picture or image without narrowing of the bright or white areas of such image or picture.

Figure 9:
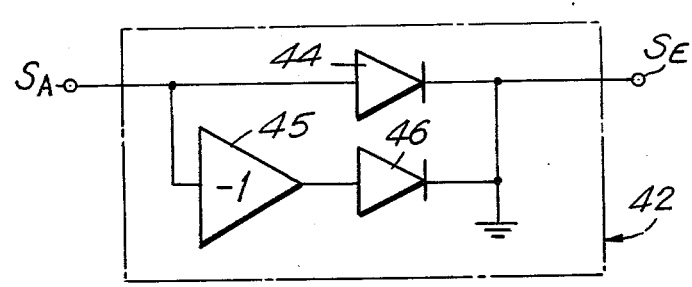
FIG. 9 is a diagrammatic view illustrating a circuit that may be used for one of the components shown on FIG. 7.

As shown on FIG. 9, the polarity equalizer 42 employed in the waveshaping circuit 21' of FIG. 7 may simply consist of a first diode 44 connected in parallel with a series connection of an inverter 45 and a second diode 46. The diodes 44 and 46 both have the same polarity so that the positive polarity portion of the differentiated signal $S_A$ passes through diode 44, while the negative polarity portion of signal $S_A$, after being inverted by inverter 45, passes through diode 46.

Figure 10:
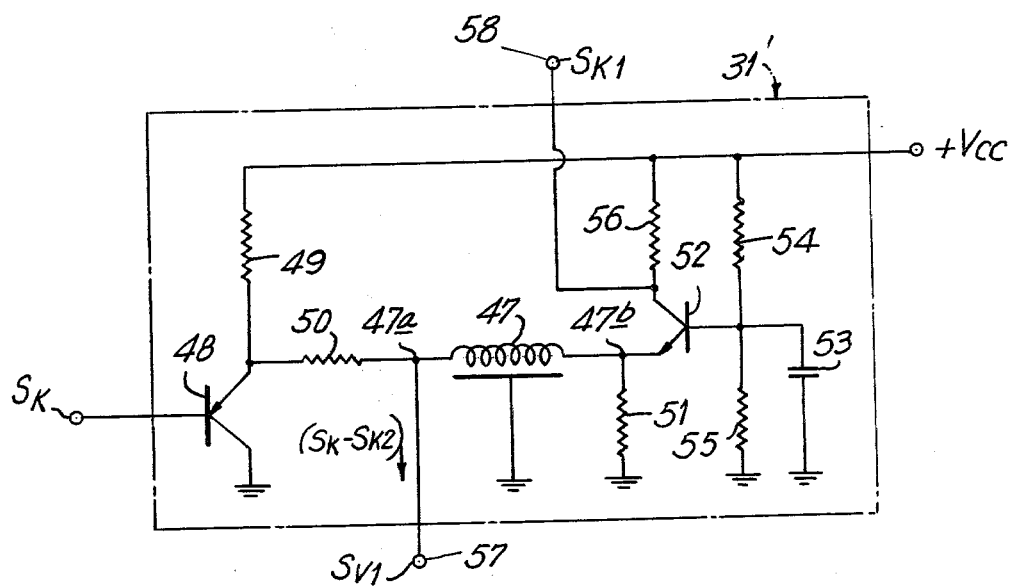
FIG. 10 is a wiring diagram illustrating another embodiment of a portion of the circuit shown on FIG. 4 for effecting beam velocity modulation in accordance with this invention.

In the embodiment of the invention described above with reference to FIG. 4, the differentiation circuit 31 is employed for detecting the rising and falling edges of the high level signal portions of the compensated video signal $S_K$ and for providing output signals or beam velocity modulation signals in correspondence to the detected rising and falling edges. However, reference to FIG. 10 will show that a circuit 31' of a type disclosed in detail in U.S. Pat. No. 3,936,872, may be employed in place of differentiation circuit 31 for providing the desired beam velocity modulating signal. More particularly, circuit 31' is known to contain a single delay line 47 having input and output ends 47a and 47b, with the compensated video signal $S_K$ being applied to input end 47a by way of a transistor 48 of collector-common configuration which acts to amplify the signal without altering the phase thereof. More specifically, as shown, the compensated video signal $S_K$ is applied to the base electrode of transistor 48 which has its collector connected to ground, while the emitter of transistor 48 is connected through a resistor 49 to an operating voltage source $+V_{cc}$, and through a resistor 50 to the input end 47a of delay line 47. Further, as shown, the output end 47b of delay line 47 is connected through a bleeder resistor 51 to ground, and is also connected to a transistor 52 of base-common configuration which acts as an impedance converter. More specifically, transistor 52 is shown to have its emitter connected to the output end 47b of delay line 47 while its base electrode is connected to ground through a capacitor 53 and also connected between biasing resistors 54 and 55 which are connected in series between operating voltage source $+V_{cc}$ and ground. Finally, a resistor 56 is connected between the operating voltage source and the collector of transistor 52, and output terminals 57 and 58 are respectively connected to the input end 47a of delay line 47 and to the collector of transistor 52.

In circuit 31', bleeder resistor 51 is dimensioned to provide a relatively small current flow therethrough, while the input impedance, that is, the base-emitter impedance of transistor 52 is very small in respect to the impedance of resistor 51. Therefore, in response to a transient or sharp change in the compensated video signal transmitted along delay line 47, the output end 47b of the latter is shorted to ground so as to cause a negative reflected wave to travel back along delay line 47 to its input end 47a. As a result of the foregoing, the resistor 56 detects the short circuit current at the output end of delay line 47, and more precisely at the collector of transistor 52, so as to provide a corresponding voltage or signal $S_{K1}$ at output terminal 58 which corresponds to the compensated video signal $S_K$ once delayed by the delay line 47. Further, the reflected wave returning to the input end of delay line 47 in response to a transient change in the compensated video signal $S_K$ results in a signal $S_{K2}$ that corresponds to the signal $S_K$ twice delayed by the delay line 47. Therefore, in response to a transient change in the signal $S_K$, there is obtained at output terminal 57 a signal $S_{V1}$ equal to the difference between compensated video signal $S_K$ and the twice delayed signal $S_{K2}$. When using the circuit 31 of FIG. 10 in place of the differentiation circuit 31 in the apparatus of FIG. 4, the output signal $S_{K1}$ is applied to the cathode 12 of the cathode ray tube 11 for controlling the intensity of the electron beam, while the output signal $S_{V1}$ is applied from circuit 31' to supplemental deflecting device 32 for effecting the beam scanning velocity modulation.

In the above described embodiments of the invention, the signal $S_V$ or $S_{V1}$ for controlling the beam scanning velocity modulation has been applied across the plates 32a and 32b of the supplemental deflection device 32 or across the parts 38a and 38b of the focusing lens electrode 38. However, it will be understood that, in all of the described embodiments of the invention, the signal $S_V$ or $S_{V1}$ from circuits 31 or 31', respectively, can be superimposed on the horizontal sweep or deflection signal and applied with the latter to the horizontal deflection coil of the main deflection yoke 13 so as to again modulate the beam scanning velocity in the line scanning direction.

Figure 5:
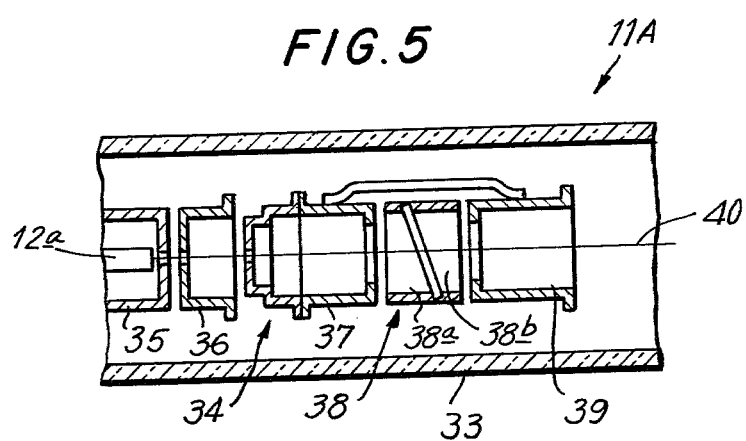
FIG. 5 is an axial sectional view of an electron gun in a cathode ray tube which is particularly suited for use with a beam velocity modulation arrangement according to this invention.

Further, in FIGS. 4 and 5 of the drawings, the invention has been illustrated as applied to a monochrome television receiver for modulating the beam scanning velocity of a single electron beam in the cathode ray tube 11 or 11A. However, it will be understood that the invention is similarly applicable to a color television receiver in which the luminance component of the color television signal is the video signal that is compensated in circuit 21 or 21' and then detected in circuit 31 or 31'.

In any event, it will be apparent that, in a television receiver or other video signal reproducing apparatus according to this invention, the sharpness of the reproduced image or picture is improved without a decrease in the width of the relatively bright or white areas of the reproduced picture.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope of the invention, as defined in the appended claims.

What is claimed is:

1. A video signal reproducing apparatus comprising
a source of a video signal representing at least the brightness of a video picture and in which bright picture portions are represented by video signal portions of high level defined between respective rising and falling edges;
waveshaping means receiving said video signal from said source for providing a corresponding compensated video signal in which the width of each of said high level signal portions between said respective rising and falling edges is increased, said waveshaping means including delay means receiving said video signal from said source for providing a delayed video signal, and OR gate means having inputs receiving said video signal from said source and said delayed video signal, respectively, and an output at which said compensated video signal appears;
a cathode ray tube having a screen, an electron gun including beam producing means directing an electron beam generally along the axis of the tube toward said screen for impingement on the latter and being controlled in response to said compensated video signal from said waveshaping means so that the intensity of the beam is modulated in accordance with said compensated video signal, and deflection means for causing said beam to scan said screen in line-scanning and vertical directions, respectively;
detecting means also receiving said compensated video signal from said waveshaping means and detecting said rising and falling edges of the high level signal portions of said compensated video signal for providing output signals in correspondence to the detected rising and falling edges; and
beam velocity modulation means for modulating the scanning velocity of said electron beam in said line-scanning direction in accordance with said output signals from said detecting means.

2. A video signal reproducing apparatus according to claim 1; in which said OR gate means includes first and second transistors having respective collector-emitter paths connected in parallel between an operating voltage source and said output of the OR gate means, said first and second transistors further having respective base electrodes constituting said inputs receiving said video signal from said source thereof and said delayed video signal, respectively.

3. A video signal reproducing apparatus according to claim 1; in which said detecting means includes means differentiating said compensated video signal so as to provide said output signals in correspondence to said detected rising and falling edges.

4. A video signal reproducing apparatus comprising
a source of a video signal representing at least the brightness of a video picture and in which bright picture portions are represented by video signal portions of high level defined between respective rising and falling edges;
waveshaping means receiving said video signal from said source for providing a corresponding compensated video signal in which the width of each of said high level signal portions between said respective rising and falling edges is increased, said waveshaping means including differentiating means for differentiating the video signal from said source of the latter, polarity equalizing means acting on the differentiated signal from said differentiating means for providing a differentiated signal of one polarity, and adder means adding the video signal from said source thereof and said differentiated signal of one polarity to provide said compensated video signal;
a cathode ray tube having a screen, an electron gun including beam producing means directing an electron beam generally along the axis of the tube toward said screen for impingement on the latter and being controlled in response to said compensated video signal from said waveshaping means so that the intensity of the beam is modulated in accordance with said compensated video signal, and deflection means for causing said beam to scan said screen in line-scanning and vertical directions, respectively;
detecting means also receiving said compensated video signal from said waveshaping means and detecting said rising and falling edges of the high level signal portions of said compensated video signal for providing output signals in correspondence to the detected rising and falling edges; and beam velocity modulation means for modulating the scanning velocity of said electron beam in said line-scanning direction in accordance with said output signals from said detecting means.

5. A video signal reproducing apparatus according to claim 4; in which said polarity equalizer includes a first diode connected in parallel with a series connection of an inventer and a second diode.

6. A video signal reproducing apparatus according to claim 4; in which said detecting means includes means differentiating said compensated video signal so as to provide said output signals in correspondence to said detected rising and falling edges.

7. A video signal reproducing apparatus comprising
a source of a video signal representing at least the brightness of a video picture and in which bright picture portions are represented by video signal portions of high level defined between respective rising and falling edges;
waveshaping means receiving said video signal from said source for providing a corresponding compensated video signal in which the width of each of said high level signal portions between said respective rising and falling edges is increased;
a cathode ray tube having a screen, an electron gun including beam producing means directing an electron beam generally along the axis of the tube toward said screen for impingement on the latter and being controlled in response to said compensated video signal from said waveshaping means so that the intensity of the beam is modulated in accordance with said compensated video signal, and deflection means for causing said beam to scan said screen in line-scanning and vertical directions, respectively;
detecting means also receiving said compensated video signal from said waveshaping means and detecting said rising and falling edges of the high level signal portions of said compensated video signal for providing output signals in correspondence to the detected rising and falling edges, said detecting means including means differentiating said compensated video signal so as to provide said output signals in correspondence to said detected rising and falling edges; and
beam velocity modulation means for modulating the scanning velocity of said electron beam in said line-scanning direction in accordance with said output signals from said detecting means.

8. A video signal reproducing apparatus comprising
a source of a video signal representing at least the brightness of a video picture and in which bright picture portions are represented by video signal portions of high level defined between respective rising and falling edges;
waveshaping means receiving said video signal from said source for providing a corresponding compensated video signal in which the width of each of said high level signal portions between said respective rising and falling edges is increased;
a cathode ray tube having a screen, an electron gun including beam producing means directing an electron beam generally along the axis of the tube toward said screen for impingement on the latter and being controlled in response to said compensated video signal from said waveshaping means so that the intensity of the beam is modulated in accordance with said compensated video signal, and deflection means for causing said beam to scan said screen in line-scanning and vertical directions, respectively;
detecting means also receiving said compensated video signal from said waveshaping means and detecting said rising and falling edges of high level signal portions of said compensated video signal for providing output signals in correspondence to the detected rising and falling edges; and
beam velocity modulation means for modulating the scanning velocity of said electron beam in said line-scanning direction in accordance with said output signals from said detecting means, said beam velocity modulation means including a tubular electrode on said axis of the tube for the passage of said electron beam axially through said tubular electrode between said beam producing means and said screen, said tubular electrode being in two parts which are axially separated along a vertical plane that is inclined relative to said axis of the tube, and means for applying said output signals from the detecting means across said two parts of the tubular electrode.

9. A video signal reproducing apparatus according to claim 8; in which said tubular electrode is included in electron lens means for focusing said beam at said screen, and said electron lens means further includes at least another tubular electrode arranged coaxially in respect to the first mentioned tubular electrode, with a relatively low potential being applied to said first tubular electrode and a relatively high potential being applied to said other electrode for producing an electrical field which effects said focusing of the beam.

* * * * *